United States Patent Office 2,774,785
Patented Dec. 18, 1956

2,774,785

ADDITION OF HYDROGEN CHLORIDE OR HYDROGEN BROMIDE TO MALEIC, FUMARIC, OR ACRYLIC ACIDS OR THEIR ESTERS

Vernon P. Wystrach, Stamford, Conn., assignor to American Cyanamid Company, New York, N. Y., a corporation of Maine No Drawing. Application February 23, 1954,
Serial No. 412,067

8 Claims. (Cl. 260—485)

This invention relates to hydrohalogenation and more particularly to a process for adding a hydrogen halide to an alpha-beta unsaturated compound selected from the group consisting of acids and esters.

Hydrogen halides under normal conditions add to alpha-beta unsaturated compounds only with difficulty. This difficulty has been overcome in the past by the use of a catalyst such as a quaternary ammonium salt. It is an object of the present invention to eliminate the need for a catalyst in such hydrohalogenation processes.

This object has been achieved in a surprisingly straightforward manner. An alpha-beta unsaturated compound either in the form of an acid or an ester is subjected to the action of a hydrogen halide in the presence of dimethylformamide as a solvent.

The yield obtained by the use of dimethylformamide as a solvent in the hydrohalogenation reaction is comparable with the yield obtained in the past with the use of a catalyst. However, the use of dimethylformamide does not preclude the use of a catalyst; if both the solvent and catalyst are used together, high yields, better than 90%, can be obtained.

Dimethylformamide is unusually suitable for the process of the present invention in that it is inert to chemical reaction with hydrogen halides yet at the same time it dissolves the hydrogen halides to an unusual extent. Although water may be present in the dimethylformamide solvent it serves no useful purpose.

The addition of the hydrogen halide may be made at any convenient temperature. Low temperatures favor the solubility of the hydrogen halide in the dimethylformamide, while higher temperatures favor the speed of reaction with which the hydrogen halide reacts with the alpha-beta unsaturated compound. Thus, the temperature in any given reaction will be chosen as a compromise between speed of reaction and solubility of hydrogen halide in the reaction medium. It often will be advisable to saturate the reaction medium with hydrogen halide at a lower temperature and then warm the reaction medium to aid in the reaction of the hydrogen halide with the alpha-beta unsaturated compound. The reaction medium may then be cooled and more hydrogen halide added, followed again by heating to increase speed of reaction. A considerable excess of the hydrogen halide, for example, either hydrogen chloride or hydrogen bromide, may be used without substantially increasing the formation of by-products.

The course of the hydrohalogenation usually proceeds such that the halogen adds on in the beta position to the carboxyalkyl group. In the case of diesters or mono basic acids this has no significance. It is only in the case of a mono ester of a dibasic acid that the above rule is of significance.

As mentioned earlier the hydrohalogenation process of the present invention is carried out on alpha-beta unsaturated compounds selected from the group consisting of acids and esters. The following are representative of the acids that are suitable in the process of the present invention: acrylic acid, maleic acid, fumaric acid.

The following are representative of the esters that are suitable in the process of the present invention: methyl acrylate, ethyl acrylate, butyl acrylate, isobutyl acrylate, beta methoxyethyl acrylate, benzyl acrylate, phenethyl acrylate, 2-thionyl acrylate, alpha-chloro acrylic acid, ethyl alpha-chloro acrylate, mono- and dimethyl fumarate, mono- and dimethyl maleate, mono- and diethyl fumarate, mono- and diethyl maleate, mono- and dibutyl fumarate, mono- and dibutyl maleate, and other maleic and fumaric acid derivatives having $\alpha,\beta$ unsaturation.

The hydrohalogenation process is carried out with varying degrees of ease depending on the alpha-beta unsaturated compound. A diester hydrohalogenates easiest; a monoester of a dibasic compound hydrohalogenates next easiest; an ester of a monobasic acid hydrohalogenates with a little more difficulty; and the acids hydrohalogenate with the greatest difficulty.

The following examples will serve to illustrate the invention:

*Example 1*

Gaseous HCl is passed into a mixture of 86.1 gms. (0.5 mol) of diethyl maleate and 30 cc. of dimethyl formamide. The temperature fluctuated between 18° C. and 60° C. At the end of four hours the mixture had retained 27.7 gms. of HCl.

The product was drowned in water, the organic layer separated, the water layer extracted with ether, and the ether washings and the organic layer combined. After filtering and drying, the diethyl alpha-chlorosuccinate was recovered by vacuum distillation. 79.4 gms. of substantially pure product was recovered for a yield of 76.1% based on the diethyl maleate starting material.

*Example 2*

Gaseous HCl is passed into a mixture of 72 gms. (0.5 mol) monoethyl fumarate, 30 cc. dimethylformamide, and 2 gms. tetramethylammonium chloride for a period of 8 hours. The total HCl uptake is 47.0 gms. After drowning and extraction as in Example 1, the product was distilled to yield 84.5 gms. of an almost colorless viscous liquid, for a yield of 91.2% based on the original mono ester.

*Example 3*

Gaseous hydrobromic acid is passed into a mixture of 36 gms. (0.5 mol) acrylic acid and 30 cc. dimethylformamide for a period of 2 hours at an average temperature of about 60° C. The takeup of HBr is 44 gms. After working up the product as in Example 1, 65.5 gms. were recovered for a yield of 86% based on the starting acrylic acid.

I claim:

1. A process for hydrohalogenation which comprises bringing into reactive contact at ambient temperatures and atmospheric pressure an alpha-beta unsaturated compound selected from the group consisting of acrylic, maleic and fumaric acids, their lower alkyl esters and the lower alkyl diesters of maleic and fumaric acid, dimethyl formamide, and a gaseous hydrogen halide selected from HCl and HBr, and maintaining the mixture at from about 18° to about 60° C., until reaction substantially ceases.

2. A process according to claim 1 in which said unsaturated compound is a maleic compound.

3. A process according to claim 1 in which said unsaturated compound is a fumaric compound.

4. A process according to claim 1 in which said unsaturated compound is an acrylic compound.

5. A process according to claim 1 in which said hydrogen halide is hydrochloric acid.

6. A process according to claim 1 in which said hydrogen halide is hydrobromic acid.

7. A process for hydrohalogenation according to claim 1 in which the reaction mixture is saturated with the hydrohalide at ambient temperature in the presence of dimethylformamide and the so-treated mass is heated to an elevated temperature not exceeding about 60° C.

8. A process for hydrohalogenation according to claim 1 in which additional gaseous hydrogen halide is supplied during the course of heating and such addition is continued until reaction between said hydrogen halide and said unsaturated compound substantially ceases.

References Cited in the file of this patent

Anschutz et al.: Ber., 15, 642 (1882).
Perkin: Ber. 15, 1074 (1882).